Figure 1:
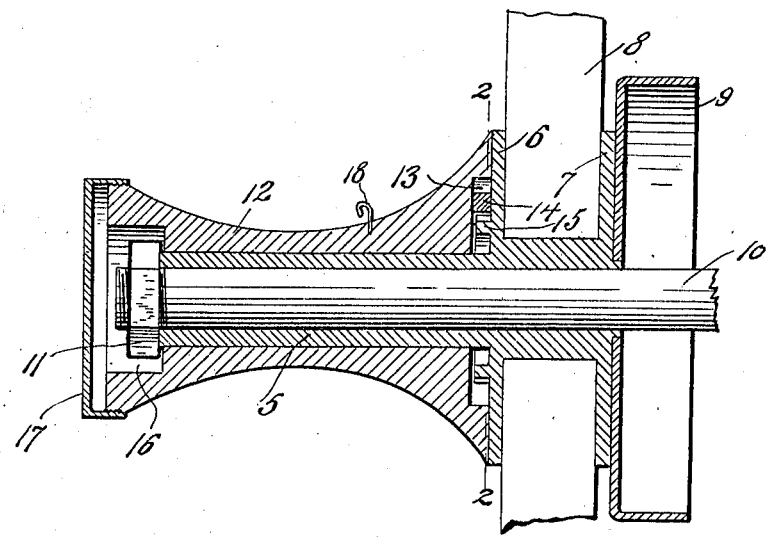

H. EWOLDT.
HAULING ATTACHMENT FOR AUTOMOBILES.
APPLICATION FILED NOV. 8, 1918.

1,298,681.

Patented Apr. 1, 1919.

Inventor
Henry Ewoldt

By *Milo R. Stevens Co.*

Attorneys

UNITED STATES PATENT OFFICE.

HENRY EWOLDT, OF GRAND ISLAND, NEBRASKA.

HAULING ATTACHMENT FOR AUTOMOBILES.

1,298,681. Specification of Letters Patent. Patented Apr. 1, 1919.

Application filed November 8, 1918. Serial No. 261,685.

*To all whom it may concern:*

Be it known that I, HENRY EWOLDT, a citizen of the United States, residing at Grand Island, in the county of Hall and State of Nebraska, have invented certain new and useful Improvements in Hauling Attachments for Automobiles, of which the following is a specification.

This invention relates to devices applicable to automobile wheels for the purpose of hauling the car out of mud holes and other soft places in the road, the same consisting of a winding drum so associated with one of the drive wheels of the car, that a hauling line connected to the drum is wound thereon upon setting the wheel in motion, whereby the car is hauled out of the place in which it is mired.

The invention has for its object to provide a very simple and efficient device of the character stated, and one which is a permanent fixture on the wheel, so that it is ready and in place for use at all times.

The object stated is attained by means of a novel combination and arrangement of parts to be hereinafter described and claimed, and in order that the same may be better understood, reference is had to the accompanying drawing forming a part of this specification.

Figure 2:
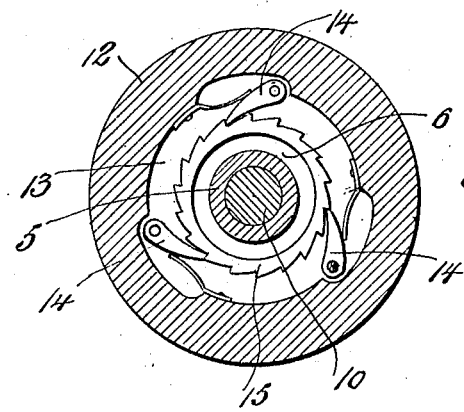

In the drawing,

Figure 1 is a central longitudinal section of a wheel hub showing the application of the invention, and Fig. 2 is a cross section on the line 2—2 of Fig. 1.

Referring specifically to the drawing, 5 denotes the hub of one of the rear or drive wheels of an automobile or other motor vehicle. The hub is of standard design and has the usual flanges 6 and 7 between which the spokes 8 are held at their inner ends. The hub is also equipped with a brake drum 9. The drive axle shaft on which the hub is mounted is shown at 10, and its outer end is threaded to receive the usual retaining nut 11.

The body of the hub 5 is made somewhat longer than an ordinary hub, and on said body is loosely mounted a winding drum 12. One end of this drum abuts against the outer face of the outer hub flange 6, and this end has a recess 13 in which are mounted spring pressed pawls 14, the same being pivoted to the drum end. On the outer face of the flange 6 is a ratchet ring 15 which extends into the recess 13 and is engageable by the pawls 14, whereby a pawl-and-ratchet drive between the hub and the drum is produced. This pawl-and-ratchet drive mechanism is so arranged that only the forward motion of the hub is transmitted to the drum. It will therefore be evident that if the car should be mired, a hauling line may be attached to the drum and anchored a suitable distance ahead of the car, and upon throwing in the clutch to set the shaft 10 in motion for a forward drive, the drum is turned to wind the line thereon, whereupon the car is drawn forward out of the mud hole or other soft place in the road. As this expedient is well understood, a further description thereof is not necessary.

The outer end of the drum 12 has a recess 16 to accommodate the nut 11, and the latter engages this recessed end of the drum and therefore also serves to hold the drum in place on the hub 5 against endwise separation therefrom. The recess 16 is closed by a cap 17.

The drum 12 is a permanent fixture on the hub and it is therefore always ready for use, and there is nothing to put on or take off except the hauling line, which latter, with a suitable anchoring device, can be conveniently carried in the tool box of the car. The device is very simple and inexpensive, and devoid of all parts liable to get out of order.

The drum 12 is fitted with a hook or similar device 18 for attachment of the hauling line. The invention is shown applied to one of the drive wheels of the car but it will be understood that the other drive wheel may be similarly equipped.

I claim:

1. The combination with the drive-wheel hub of a motor vehicle and its axle shaft; of a winding drum loosely mounted on the hub body, a pawl-and-ratchet driving connection between the hub and the drum, and a retaining member for the hub carried by the outer end of the axle shaft, said member being opposite the outer end of the drum for holding the drum on the hub body.

2. The combination with the drive-wheel hub of a motor vehicle and its axle shaft; of a winding drum loosely mounted on the hub body, a pawl-and-ratchet driving connection between the hub and the drum, and a retaining member for the hub carried by the outer end of the axle shaft, said member being opposite the outer end of the drum for holding the drum on the hub body, and said drum end being recessed to house the retaining member.

In testimony whereof I affix my signature.

HENRY EWOLDT.

Copies of this patent may be obtained for five cents each, by addressing the "Commissioner of Patents, Washington, D. C."